US010915149B2

(12) United States Patent
Harmon et al.

(10) Patent No.: US 10,915,149 B2
(45) Date of Patent: Feb. 9, 2021

(54) DUAL SPRING AND DRIVER ASSEMBLY AND CORRESPONDING ELECTRONIC DEVICES

(71) Applicant: Motorola Mobility LLC, Chicago, IL (US)

(72) Inventors: Roger Harmon, Crystal Lake, IL (US); Alberto Cavallaro, Northbrook, IL (US); Wayne Morrison, Northbrook, IL (US); Jee-Woong Lee, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 140 days.

(21) Appl. No.: 16/127,024

(22) Filed: Sep. 10, 2018

(65) Prior Publication Data

US 2020/0081499 A1    Mar. 12, 2020

(51) Int. Cl.
*G06F 1/16* (2006.01)
*H04M 1/02* (2006.01)
*E05D 3/12* (2006.01)

(52) U.S. Cl.
CPC ............. *G06F 1/1681* (2013.01); *E05D 3/12* (2013.01); *G06F 1/1616* (2013.01);
(Continued)

(58) Field of Classification Search
CPC .... G06F 1/1681; G06F 1/1616; G06F 1/1652; H04M 1/0216; H04M 1/022; H04M 1/026; H04M 1/0268; H04M 2250/16; H04M 2250/12; H04M 2250/22; Y10T 16/547; Y10T 16/53286; Y10T 16/53848;
(Continued)

(56) References Cited

U.S. PATENT DOCUMENTS 4,483,394 A    11/1984    Peppers et al.
6,377,324 B1    4/2002    Katsura
(Continued)

FOREIGN PATENT DOCUMENTS

DE    102006013424    10/2007
EP    1403460    3/2004

OTHER PUBLICATIONS

Bui, Hung , "NonFinal Office Action", U.S. Appl. No. 16/520,174, filed Jul. 23, 2019; dated Mar. 4, 2020.
(Continued)

*Primary Examiner* — William L Miller
(74) *Attorney, Agent, or Firm* — Philip H. Burrus, IV

(57) ABSTRACT

A device includes a housing. The housing can define a duct having a central axis. A first loading surface can extend into the duct toward the central axis, while a second loading surface can extend into the duct toward the central axis. A first driver and a second driver can be situated within the duct along the central axis. The first driver can abut the second driver. A first spring biases the first driver away from the first loading surface, thereby causing the first driver to apply a first loading force to the second driver. A second spring applies a second loading force to the second driver, along a common direction with the first loading force, to bias the second driver away from the second loading surface, with the first spring and second spring operating in parallel on the second driver.

20 Claims, 8 Drawing Sheets

(52) U.S. Cl.
CPC .......... *G06F 1/1652* (2013.01); *H04M 1/022* (2013.01); *H04M 1/0216* (2013.01); *H04M 1/0268* (2013.01); *Y10T 16/547* (2015.01)

(58) Field of Classification Search
CPC ........... Y10T 16/5398; Y10T 16/54035; Y10T 16/541; Y10T 16/54; E05D 3/06; E05D 3/122; E05D 11/08; E05D 3/12; E05Y 2900/606; E05Y 2800/244; E05Y 2800/21; F16C 11/04; E05F 1/1253
USPC ......... 16/366, 284, 296, 312, 341, 354, 319; 361/679.27; 379/433.13; 455/575.3
See application file for complete search history.

(56) References Cited

U.S. PATENT DOCUMENTS

| | | | |
|---|---|---|---|
| 6,402,713 B1 | 6/2002 | Doyle | |
| 7,714,801 B2 | 5/2010 | Kimmel | |
| 8,028,555 B2 | 10/2011 | Lurie | |
| 8,773,849 B2* | 7/2014 | Bohn | H04M 1/0274 361/679.28 |
| 8,982,542 B2* | 3/2015 | Bohn | G06F 1/1681 361/679.06 |
| 9,235,239 B2 | 1/2016 | van Dijk et al. | |
| 9,535,465 B2* | 1/2017 | Bohn | H04M 1/022 |
| 9,600,035 B2 | 3/2017 | Park et al. | |
| 10,054,990 B1* | 8/2018 | Harmon | G06F 1/1616 |
| 10,063,677 B2 | 8/2018 | Cavallaro et al. | |
| 10,104,790 B2 | 10/2018 | Lee et al. | |
| 10,110,717 B1 | 10/2018 | Liu | |
| 10,469,635 B1* | 11/2019 | Carlson | G06F 1/1683 |
| 10,480,225 B1* | 11/2019 | Hsu | E05D 3/122 |
| 10,485,115 B1* | 11/2019 | Cromer | G06F 1/1683 |
| 10,491,725 B1* | 11/2019 | Harmon | H04B 1/3888 |
| 10,545,541 B1* | 1/2020 | Dighde | G06F 1/1641 |
| 2004/0226138 A1* | 11/2004 | Harmon | E05D 11/1064 16/284 |
| 2012/0002360 A1* | 1/2012 | Seo | G06F 1/1652 361/679.01 |
| 2012/0162866 A1* | 6/2012 | Bohn | H04M 1/0216 361/679.01 |
| 2012/0264489 A1 | 10/2012 | Choi et al. | |
| 2013/0037228 A1 | 2/2013 | Verschoor et al. | |
| 2013/0342094 A1* | 12/2013 | Walters | H04M 1/0247 312/319.2 |
| 2014/0042293 A1* | 2/2014 | Mok | H04M 1/0268 248/682 |
| 2014/0287804 A1* | 9/2014 | Bohn | G06F 1/1681 455/575.3 |
| 2015/0261259 A1 | 9/2015 | Endo et al. | |
| 2016/0143162 A1 | 5/2016 | Van Dijk et al. | |
| 2016/0302314 A1* | 10/2016 | Bae | G06F 1/16 |
| 2017/0115701 A1 | 4/2017 | Bae et al. | |
| 2017/0264723 A1 | 9/2017 | Mok | |
| 2018/0059728 A1 | 3/2018 | Kim et al. | |
| 2018/0066465 A1 | 3/2018 | Tazbaz Errol | |
| 2018/0292860 A1* | 10/2018 | Siddiqui | G06F 1/1652 |

OTHER PUBLICATIONS

Bui, Hung , "Notice of Allowance", U.S. Appl. No. 16/520,174, filed Jul. 23, 2019; dated May 6, 2020.
Huynh, Nam T. , "NonFinal OA", U.S. Appl. No. 16/862,274, filed Apr. 23, 2020; dated Jun. 12, 2020.
Huynh, Nam Trung , "Notice of Allowance", U.S. Appl. No. 16/579,517, filed Sep. 23, 2019; dated Feb. 5, 2020.
De Biolley, Luc , "European Search Report", EP 19188076; dated Jan. 20, 2020.
Bui, Hung S. , "NonFinal OA", U.S. Appl. No. 16/016,316, filed Jun. 22, 2018; dated Apr. 30, 2019.
Eich, Martine , "PCT Search Report and Written Opinion", PCT Application No. PCT/US2019/023925; Filed Mar. 25, 2019; dated May 17, 2019.
Huynh, Nam Trung , "NonFinal Office Action", U.S. Appl. No. 16/131,937, filed Sep. 14, 2018; dated Mar. 28, 2019.
Car Door Hinge; Image; Unknown Image Source; Unknown publication date but prior to fling of present application.
Pemko CFM83 Full-Mortise Continuous Geared Hinge; https://www.qualitydoor.com/pemko-cfm83-continuous-hinge.html; Sited Visited Feb. 2017; Unknown Publication Date but prior to filing of present application.
Spectacle HInged—Cam Mechanism; Image; Unknown source; Image obtained prior filing of present application.
Thaker, Nidhi , "Notice of Allowance", U.S. Appl. No. 15/610,368, filed May 31, 2017; dated Jun. 5, 2018.
Thaker, Nidhi Vivek , "NonFinal OA", U.S. Appl. No. 15/610,368, filed May 31, 2017; dated Jan. 24, 2018.
Bui, Hung , "Notice of Allowance", U.S. Appl. No. 16/016,316; filed Jun. 22, 2018; dated Aug. 6, 2019.
Huynh, Nam Trung , "NonFinal Office Action", U.S. Appl. No. 16/749,721, filed Jan. 22, 2020; dated Feb. 20, 2020.
Huynh, Nam Trung , "Non-Final Office Action", U.S. Appl. No. 16/597,517, filed Sep. 23, 2019; dated Oct. 29, 2019.
Huynh, Nam Trung , "Notice of Allowance", U.S. Appl. No. 16/131,937, filed Sep. 14, 2018; dated Sep. 12, 2019.
"Existing Solutions Provided by Inventor", Solution 1: Clip Type; Solution 2: outward foldable; Unknown publication date but prior to filing of present application.
"Picture of Samsung Concept Phone", Unknown publication date and source; Prior to May 1, 2018.
"Related Art Provided by Inventor", Document with list and pictures of foldable concepts; Viper and Voyager folding screens; Unknown source; Unknown publication date but prior to filing of present application.
"Samsung Galaxy X—Galaxy Fold", YouTube Video; Posted by Stuffbox on Jan. 20, 2018; https://www.youtube.com/watch?v=T-mvKaVsJOE.
Diaconescu, Adrian , "Samsung Display crushes all hope of foldable 'Galaxy X' phone release until 2019", Published on Apr. 4, 2017; hhttps://pocketnow.com/samsung-display-foldable-galaxy-x-phone-2019-release-plans.
Divyarashmi, "Samsung Galaxy X, Samsung's Foldable Display Phone is Coming Soon", Published Oct. 3, 2017; http://techstepper.com/samsungs-foldable-display-phone-is-coming-soon/.

* cited by examiner

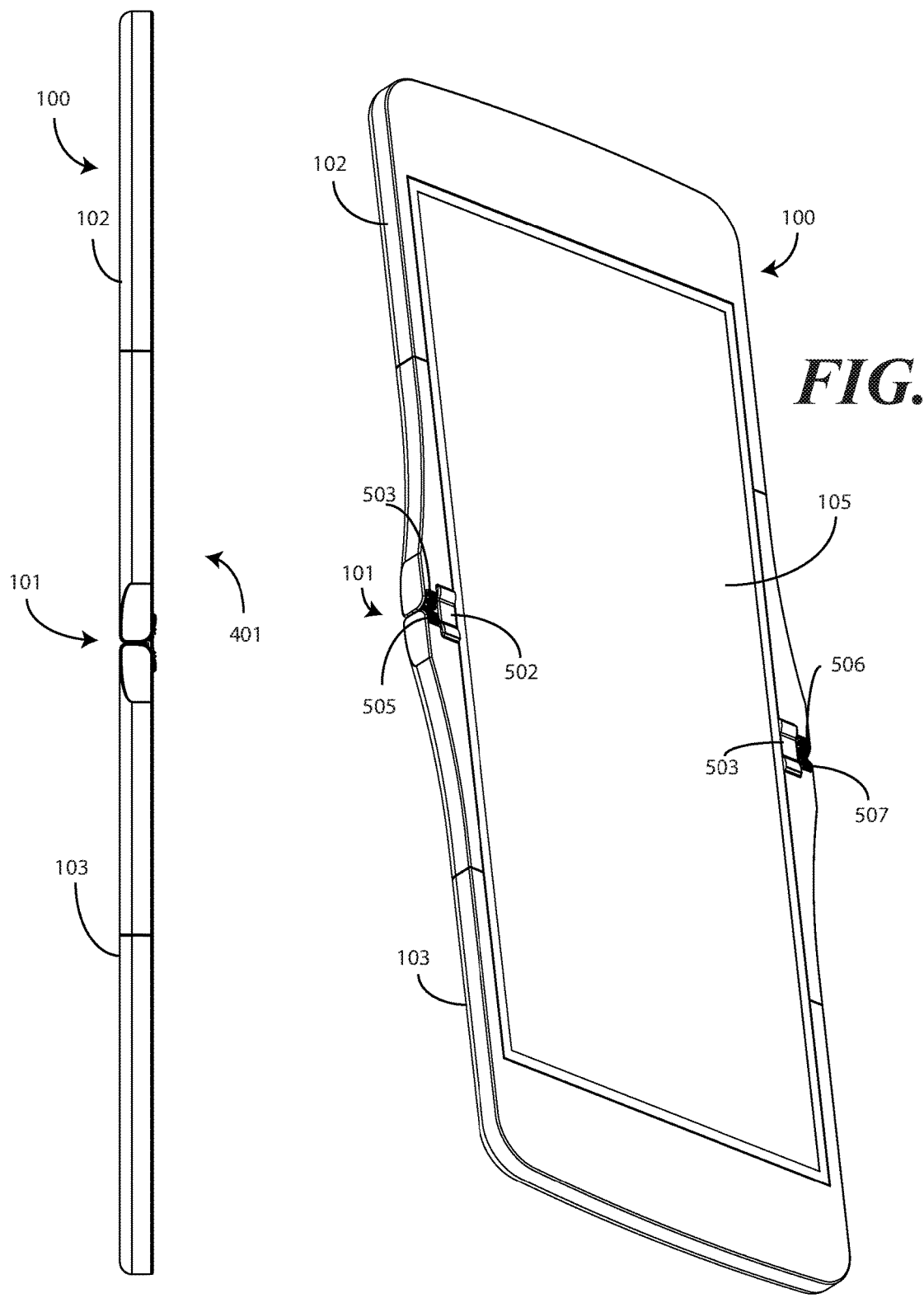

DUAL SPRING AND DRIVER ASSEMBLY AND CORRESPONDING ELECTRONIC DEVICES

BACKGROUND

Technical Field

This disclosure relates generally to electronic devices, and more particularly to hinged electronic devices.

Background Art

Mobile electronic communication devices are used by billions of people. These owners use mobile communication devices for many different purposes including, but not limited to, voice communications and data communications for text messaging, Internet browsing, commerce such as banking, and social networking.

Such mobile devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. Users may prefer the latter for a variety of reasons. Clamshell devices, when folded, generally have a smaller form factor than do candy bar devices. They therefore fit more easily in a pocket. Next, clamshell devices provide protection from the display when folded. This is in contrast to candy bar devices where the display is always exposed. It would thus be desirable to have an improved electronic device that is able to fold about a hinge.

BRIEF DESCRIPTION OF THE DRAWINGS

FIG. 4 illustrates a side elevation view of on explanatory electronic device in an open position.

FIG. 5 illustrates a perspective view of one explanatory electronic device in accordance with one or more embodiments of the disclosure in an open position.

Figure 1:
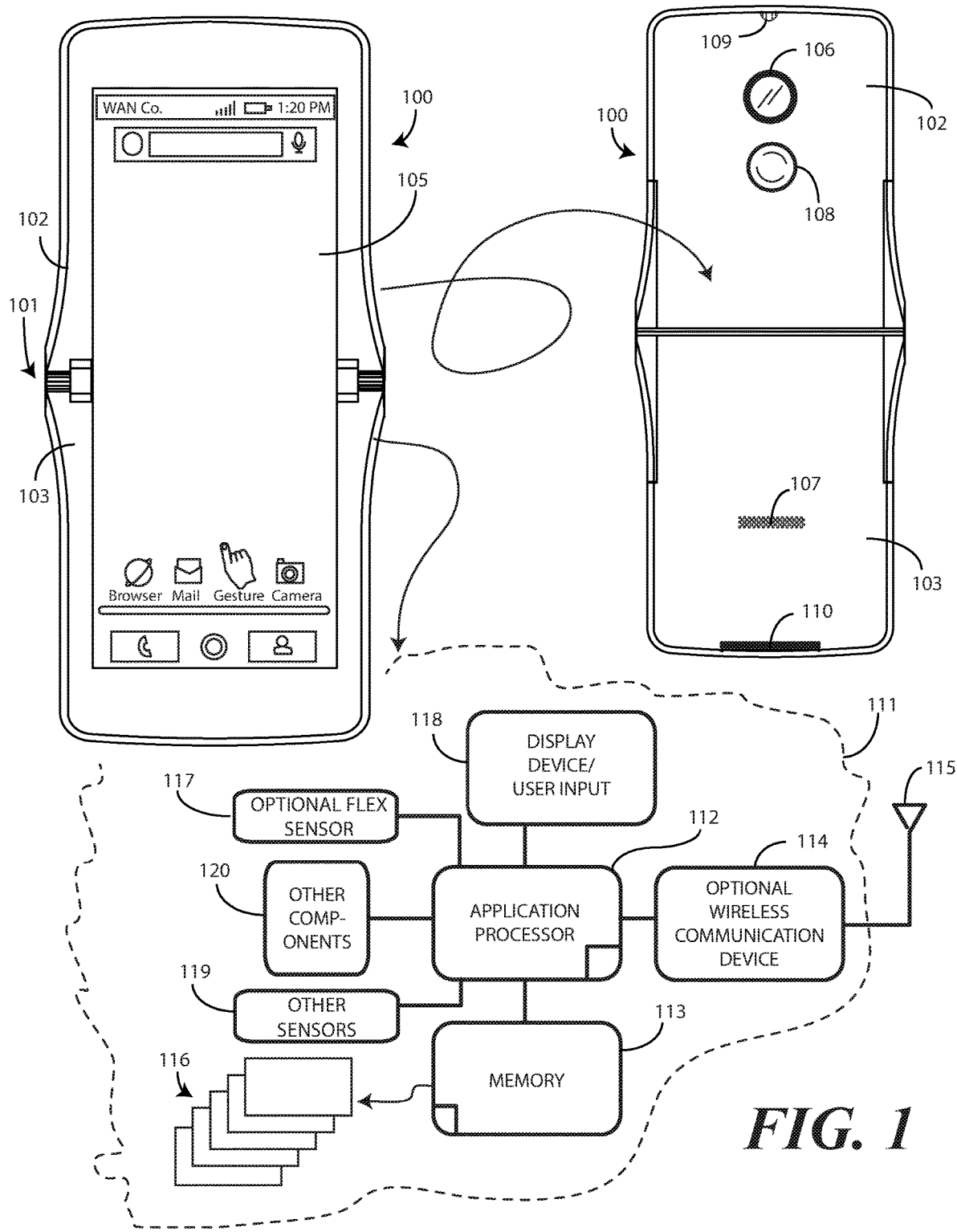
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide for a device that includes a housing. In one or more embodiments, the housing defines a duct having a central axis. In one or more embodiments at least two loading surfaces extend from the housing into the duct. For example, in one embodiment a first loading surface extends from the housing into the duct toward the central axis. Similarly, a second loading surface also extends into the duct toward the central axis. While two loading surfaces are used herein in an illustrative embodiment, those of ordinary skill in the art having the benefit of this disclosure will appreciate that spring assemblies configured in accordance with the disclosure could be extended to include three loading surfaces in the duct, four loading surfaces in the duct, and so forth.

In one or more embodiments, a first driver and a second driver are situated within the duct. In one or more embodiments, the first driver and the second driver each comprises a shaft and head, with the head of a first driver abutting the shaft of an adjacent driver.

In one or more embodiments, each loading surface defines an aperture. For example, where two loading surfaces are included a first loading surface can define a first aperture, while the second loading surface defines a second aperture.

In one or more embodiments, the shaft of each driver passes through an aperture of its corresponding loading surface. For instance, in one embodiment the first shaft of the first driver passes through an aperture of the first loading surface, while the second shaft passes through the second aperture of the second loading surface, and so forth.

In one or more embodiments, a first spring is positioned between the first loading surface and the head of the first driver. In one or more embodiments, a second spring is then placed between the second loading surface and the head of the second driver. In one or more embodiments, each spring applies a loading force to the head of its corresponding driver to bias the driver away from the loading surface. For instance, the first spring can bias the first driver away from the first loading surface while the second driver biases the second driver away from the second loading surface, and so forth.

In one or more embodiments, since the head of the first driver abuts the shaft of the second driver, when the first spring biases the first driver away from the loading surface, this causes the first driver to apply a first loading force to the second driver. In one or more embodiments, the second spring biases, at the same time, the second driver away from the second loading surface. This applies a second loading force to the second driver. In one or more embodiments, the first loading force and the second loading force are applied along a common direction. This results in both loading forces biasing the second driver away from the second loading force. In one or more embodiments, this causes the second driver to translate within the duct along the central axis.

Accordingly, in accordance with one or more embodiments the springs look, physically, to be placed in series. This is true because the second spring is disposed between the head of the second driver and the first spring, while the first spring is disposed between the second spring and the first loading surface. However, due to the fact that the first spring causes the first driver to apply the first loading force to the second driver, these two "series looking" springs actually apply a parallel force to the second driver.

Embodiments of the disclosure therefore advantageously allow for the first spring and the second spring to operate on the second driver in parallel to provide an effective "stiffer spring" that uses the same stroke as when a single spring is used, and that allows for the use of two less stiff springs rather than one larger, stiffer spring. This results in the effective "stiffer spring" to be used without requiring larger width and height dimensions of the duct to accommodate springs with materials that are thicker in diameter.

Said differently, the configuration of the first spring and the second spring provides for a stiffer spring (with same stroke) without requiring a change in material or an increasing the X-dimension and the Z-dimension of the duct. Instead, only an increase in the Y-dimension of the duct is required. This allows the first spring and the second spring, which are physically arranged in series, to operate in parallel. The parallel operation is achieved, in one or more embodiments, by a shaft and head driver extending through the first spring and providing a first loading force for the second driver while the second spring also operates on the second driver. This causes both springs to compress to same deflections as the mechanism is compressed, thus providing double the force for same deflection when using two springs of the same kind.

In one or more embodiments, this spring assembly is used in a hinged electronic device, i.e., a clamshell device, which includes a flexible display. A hinge couples a first device housing and a second device housing such that the first device housing is pivotable about the hinge toward, or away from, the second device housing. The flexible display is inwardly folding and deforms when the first device housing of the electronic device pivots toward the second electronic device housing about the hinge from an open position toward or to a closed position. Advantageously, in one or more embodiments the hinge is operable to selectively "lock" or retain the first device housing and the second device housing in either the open or closed position with a minimal form factor, thereby allowing the inwardly folding display to maintain a desired service loop and not crease.

In one or more embodiments, the hinge includes a cam having a "cat head shape." As is known in the art, cams are frequently named by the shape they take along their major faces. Illustrating by example, there are heart cams, star cams, snail cams, elliptical cams, circular cams, wedge cams, and so forth. The cam configured in accordance with one or more embodiments of the disclosure is "cat head shaped" because, in one or more embodiments, it has a major face that has the appearance of a silhouette of a cat's head. Said differently, the major face includes one or more protrusions resembling cat ears spaced by a surface resembling a cat forehead. The cam can also include two concave recesses, each resembling cat cheek, and which are referred to herein as "cat cheek" recesses. A lower surface then resembles a cat chin, with convex protrusions disposed on each side of the cat head shape between the cat cheek recesses and the cat chin resembling cat whiskers. The cam is referred to herein as a "cat head shaped" cam to make it clear that, in the convention used by cam designers, the major face resembles the head of a feline cat and not the cathead of a ship, which is a large, rectangular beam. Accordingly, the term "cathead" cam is avoided and the term "cat head shaped" is employed.

In one or more embodiments, the hinge includes a cat head shaped cam, a first follower, and a second follower. In one or more embodiments, the followers are the second drivers of the previously described spring assemblies, with one spring assembly disposed to one side of the cat head shaped cam and another spring assembly disposed to the second side of the cat head shaped cam. In one or more embodiments, the second driver of the spring assembly is biased against a first side of the cat head shaped cam by the first spring and the second spring operating in parallel. Similarly, the second driver of a second spring assembly is biased against a second side of the cat head shaped cam by another first spring and another second spring operating in parallel.

In one or more embodiments, as the first device housing pivots about the hinge toward, or away from, the second device housing, the first follower and the second follower travel about the perimeter of the cat head shape. For example, in one or more embodiments the cat head shaped cam defines a first cat ear shaped protrusion and a second cat ear shaped protrusion. In one or more embodiments, the first cat ear shaped protrusion and the second cat ear shaped protrusion extend from a first side of the cat head shaped cam. At the same time, in one or more embodiments the cat head shaped cam defines a first cat cheek recess and a second cat cheek recess. In one or more embodiments, the first cat cheek recess is positioned between the first cat ear protrusion and the cat chin on a first side of the cat head shaped cam, while the second cat cheek recess is positions on between the second cat ear protrusion and the cat chin on a second side of the cat head shaped cam. In one or more embodiments, the second side of the cat head shaped cam is disposed opposite one or more pivot axes of the cat head shaped cam from the first side.

The inclusion of the cat ear shaped protrusions and the cat cheek recesses advantageously allows the hinge to selectively lock in either the open or closed position. For instance, in one or more embodiments, the first follower and the second follower situate between the first cat ear shaped protrusion and the second cat ear shaped protrusion, along the cat forehead surface, when the first device housing is pivoted about the hinge toward the second device housing to a closed position. The first cat ear shaped protrusion and the second cat ear shaped protrusion retain the first follower and the second follower therebetween with sufficient force to lock the first device housing and the second device housing in the closed position.

By contrast, the first follower and the second follower situate in the first cat cheek recess and the second cat cheek recess, respectively, when the first device housing is pivoted about the hinge away from the second device housing toward an open position. Accordingly, the first follower and the second follower selectively lock the first device housing and the second device housing in the open position.

The use of spring assemblies configured in accordance with embodiments of the disclosure offer numerous advantages. Illustrating by example, in one or more embodiments the spring assemblies are used as followers to bias the second driver against the cat head shaped cam on only one side of the electronic device. The parallel operation of the springs provides a stiffer equivalent spring, thereby allowing followers from the other side of the electronic device to be removed. This frees up precious real estate within the electronic device for components such as volume controls or power switches.

Another advantage is that the parallel operation of the first spring and the second spring biases the second follower against the cat head shaped cam with a higher force. This results in higher torque. Higher torque results in better locking of the first device housing and the second device housing in the open position. Moreover, this higher torque allows the flexible display to be stretched flat with more force, thereby preventing mechanical bending memory effects from affecting the flexible display. Another advantage is due to the fact that the cam profile can be shorter, thereby preventing the cam from protruding as much from the electronic device.

Electronic devices having hinges configured in accordance with one or more embodiments of the disclosure offer still more advantages over prior art hinges. Illustrating by example, prior art hinges often include actuators and springs that are aligned parallel to the bending axis. Such hinges do not work with flexible displays because the display bends into the hinge, thereby creating a mechanical interference with the flexible display. With such prior art designs, the only way around this is to design an excessively thick device that is extremely wide. Additionally, prior art hinges can have form factors that situate above the split line between two device housings. This can cause the occurrence of large, visible protrusions at the pivot point, which is undesirable.

Advantageously, hinges configured in accordance with one or more embodiments of the disclosure sit flatter than do prior art hinges when in the open position. Moreover, in one or more embodiments the cat head shaped cam is disposed to the side of the flexible display and is oriented orthogonally relative to the axis of rotation between the first device housing and the second device housing. This allows the overall hinge area beneath the flexible display to be narrower.

Another advantage is that the cat head shape of the cam allows the torque required to exit the locked open position or the locked closed position to be precisely controlled by selecting the spring coefficients for the first spring and the second spring. This is important in flexible display applications because flexible displays have a tendency to hold the shape of the closed position when opened. They can therefore appear "wavy" in the open position. Embodiments of the present disclosure overcome this problem by placing the flexible display in tension when in the open position. The locking force afforded by the hinge balances the tension on the display. Additionally, the locking force in the open position can be sufficiently high that a flatter, open flexible display results. Still other advantages of using spring and driver assemblies configured in accordance with embodiments of the disclosure will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display.

In one embodiment, the display 105 is configured as an organic light emitting diode (OLED) display fabricated on a flexible plastic substrate. This allows the display 105 to be flexible so as to deform when the first device housing 102 pivots about the hinge 101 relative to the second device housing 103. However, it should be noted that other types of displays would be obvious to those of ordinary skill in the art having the benefit of this disclosure. In one or more embodiments, an OLED is constructed on flexible plastic substrates can allow the display 105 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 105 may be formed from multiple layers of flexible material such as flexible sheets of polymer or other materials. In this illustrative embodiment, the display 105 is coupled to the first device housing 102 and the second device housing 103. Accordingly, the display 105 spans the hinge 101 in this embodiment.

Features can be incorporated into the first device housing 102 and/or the second device housing 103. Examples of such features include an optional camera 106 or an optional speaker port 107, which are shown disposed on the rear side of the electronic device 100 in this embodiment, but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments.

In one embodiment, the electronic device 100 includes one or more connectors 109,110, which can include an analog connector, a digital connector, or combinations thereof. In this illustrative embodiment, connector 109 is an analog connector disposed on a first end, i.e., the top end as viewed in FIG. 1, of the electronic device 100, while connector 110 is a digital/power connector disposed on a second end opposite the first end, which is the bottom end as viewed in FIG. 1.

A block diagram schematic 111 of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 114 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
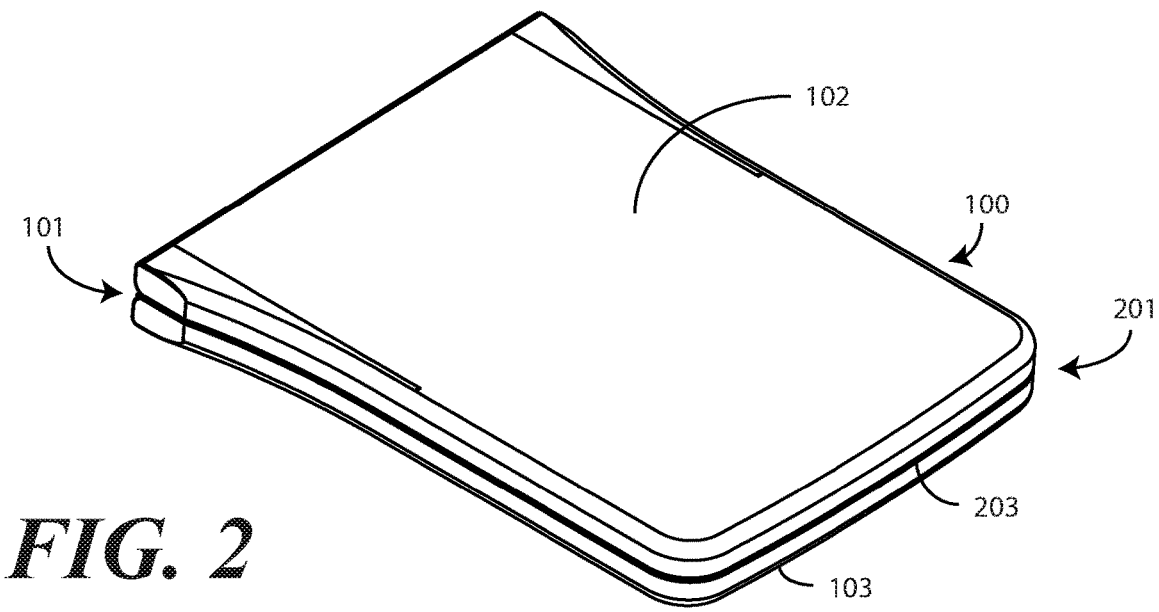
FIG. 2 illustrates a perspective view of one explanatory electronic device in accordance with one or more embodiments of the disclosure in a closed position.
Figure 3:
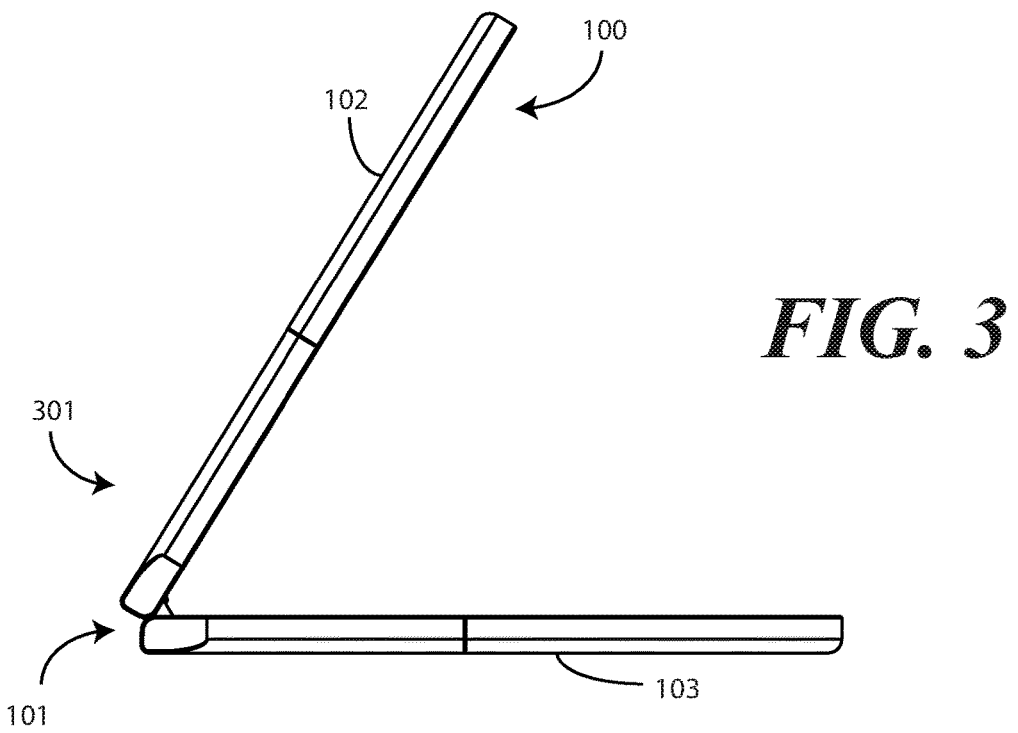
FIG. 3 illustrates a side elevation view of one explanatory electronic device in a partially open position.

In one embodiment, the electronic device 100 includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the flex sensors 117 comprise passive resistive devices manufactured from a material with an impedance that changes when the material is bent, deformed, or flexed. By detecting changes in the impedance as a function of resistance, the one or more processors 112 can use the one or more flex sensors 117 to detect bending of the first device housing 102 about the hinge 101 relative to the second device housing 103. In one or more embodiments, each flex sensor 117 comprises a bi-directional flex sensor that can detect flexing or bending in two directions. In one embodiment, the one or more flex sensors 117 have an impedance that increases in an amount that is proportional with the amount it is deformed or bent.

In one embodiment, each flex sensor 117 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 117 bends, the impedance of the resistive layer changes, thereby altering the flow of current for a given voltage. The one or more processors 112 can detect this change to determine an amount of bending. Taps can be added along each flex sensor 117 to determine other information, including the amount of bending, the direction of bending, and so forth. The flex sensor 117 can further be driven by time-varying signals to increase the amount of information obtained from the flex sensor 117 as well. While a multi-layered device as a flex sensor 117 is one configuration suitable for detecting at least a bending operation occurring to deform the electronic device 100 and a geometry of the electronic device 100 after the bending operation, others can be used as well. Other types of flex sensors 117 will be obvious to those of ordinary skill in the art having the benefit of this disclosure.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 101 toward the second device housing 103 to a closed position 201. When in the closed position 201, a front surface 202 of the first device housing 102 abuts a front surface 203 of the second device housing 103. Effectively, the first device housing 102 and the second device housing 103 are analogous to clam shells that have been shut by the claim, thereby giving rise to the "clamshell" style of device.

As noted above, and as will be explained in more detail below, in one or more embodiments the shape of the cam of the hinge 101, and in particular its inclusion of the cat ear shaped protrusions and cat cheek recesses advantageously allows the hinge 101 to selectively lock in either the open or closed position. The first follower and the second follower of the hinge 101 situate between the first cat ear shaped protrusion and the second cat ear shaped protrusion, along the cat forehead surface, when the first device housing 102 is pivoted about the hinge 101 toward the second device housing 103 to the closed position 201.

In some embodiments, additional features can be included to further retain the electronic device 100 in the closed position 201. Illustrating by example, in another embodiment, a mechanical latch can be included to retain the first device housing 102 and the second device housing 103 in the closed position 201. In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 201. In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 201 will be obvious to those of ordinary skill in the art having the benefit of this disclosure.

Turning now to FIG. 3, the electronic device 100 is shown being transitioned from the closed position (201) of FIG. 2 to a partially open position. Specifically, the first device housing 102 is pivoting about the hinge 101 away from the second device housing 103 toward an open position. The position shown in FIG. 3 is a "tent position" 301. As will be described in more detail below, the cat ear shaped protrusions of the cam advantageously bias the first device housing 102 toward the second device housing 103 at angles more acute than that shown in FIG. 3 to assist in transitioning the electronic device 100 to the closed position (201). At the same time, the cat ear shaped protrusions advantageously bias the first device housing 102 away from the second device housing 103 at angles more obtuse than that shown in FIG. 3 to assist in transitioning the electronic device 100 to the open position shown in FIGS. 4 and 5.

Turning now to FIGS. 4 and 5, illustrated therein is the electronic device 100 in an open position 401. In the open position, the first device housing 102 is rotated about the hinge 101 180-degrees out of phase with the second device housing 103 such that the first device housing 102 and the second device housing 103 effectively define a plane. The display 105 has been elongated into a flat position.

With particular attention to FIG. 5, one or more components of the hinge 101 can be seen. In this illustrative embodiment, the hinge 101 includes a first cam 502. The hinge 101 can optionally include a second cam 503. Optionally, a first toothed wheel 504 and a second toothed wheel 505 can be disposed adjacent to the first cam 502. Where included, the toothed wheels 504,505 can engage to create a symmetric angular rotation of the first device housing 102 and the second device housing 103 when the first device housing 102 pivots about the hinge 101 relative to the second device housing 103.

In one or more embodiments an optional third toothed wheel 506 and an optional fourth toothed wheel 507 are situated adjacent to the second cam 503 to perform the same function. In this illustrative embodiment, the first cam 502 and the second cam 503 are situated farther interior of the electronic device 100 than are the first toothed wheel, 504, the second toothed wheel 505, the third toothed wheel 506, or the fourth toothed wheel 507. Said differently, in this embodiment the first cam 502 and the second cam 503 are situated between the engagement of the first toothed wheel, 504 and the second toothed wheel 505, and the engagement of the third toothed wheel 506 and the fourth toothed wheel 507. In this embodiment, the display 105 is disposed between the first cam 502 and the second cam 503.

Figure 6:
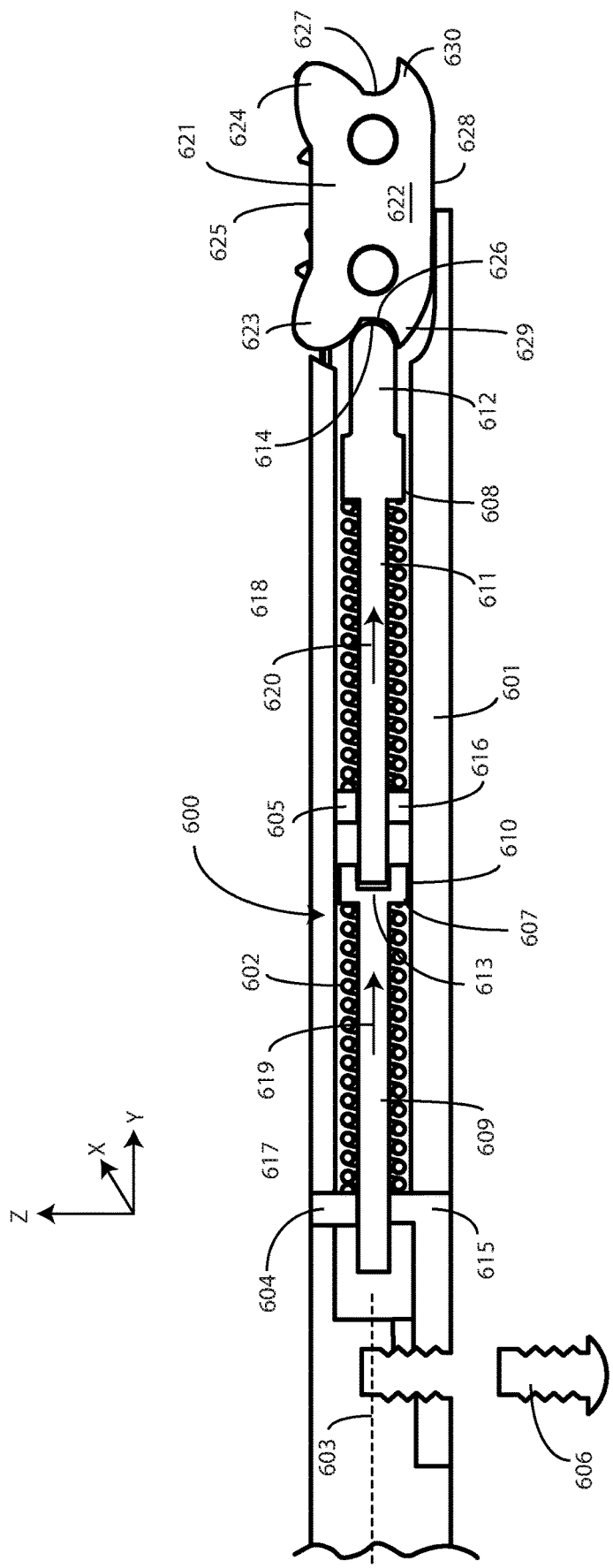
FIG. 6 illustrates one explanatory dual spring and driver assembly in accordance with one or more embodiments of the disclosure.

Turning now to FIG. 6, illustrated therein is one spring assembly 600 configured in accordance with one or more embodiments of the disclosure. In this illustrative embodiment, the spring assembly 600 is situated within the housing 601 of an electronic device.

The housing 601 of this illustrative embodiment defines a duct 602. The duct 602 defines a tube or passageway in the housing 601 into which the spring assembly 600 is placed in one or more embodiments. In this illustrative embodiment, the interior of the duct 602 is cylindrical, with a cross section of the duct 602 taken into the page being circular. However, in other embodiments this cross section of the duct 602 can take other shapes as well, including rectangular shapes, free-form shapes, octagonal shapes, and so forth.

In one or more embodiments, the duct 602 defines a central axis 603. In this illustrative embodiment, the central axis 603 is defined by the length of the duct, with the central axis 603 passing through the center of a cross section of the duct 602 taken into the page.

In one or more embodiments, at least two loading surfaces extend from the housing 601 into the duct 602. In one or more embodiments, the at least two loading surfaces extend from the housing 601 from perimeter surfaces of the duct 602 into the duct 602 toward the central axis 603.

For example, in one embodiment a first loading surface 604 extends from the housing 601 into the duct 602 toward the central axis 603. Similarly, a second loading surface 605 also extends into the duct 602 toward the central axis 603. Each loading surface can be an integral component with the housing 601 in one embodiment. Illustrating by example, in one embodiment each loading surface can be a material protrusion from the housing 601 into the duct 602. Where the housing 601 is manufactured from plastic, for example, each loading surface can be a plastic protrusion extending into the duct 602 in one embodiment.

In other embodiments, each loading surface can be a separate component that is inserted into the housing 601. For instance, in another embodiment the first loading surface 604 and the second loading surface 605 can be configured as bushings that are positioned within the duct 602. A mechanical fastener, such as a screw 606 or other device, can then hold the first loading surface 604 and/or the second loading surface 605 against the housing 601 and within the duct 602. In still other embodiments, the first loading surface 604 and the second loading surface 605 are welded to the housing 601 to retain them in the duct 602. In still other embodiments, the first loading surface 604 and the second loading surface 605 are adhesively held within the duct 602. Still other techniques for creating the first loading surface 604 and the second loading surface 605 within the duct 602 will be obvious to those of ordinary skill in the art having the benefit of this disclosure.

It should be noted that while two loading surfaces are used herein in an illustrative embodiment, embodiments of the disclosure are not so limited. Those of ordinary skill in the art having the benefit of this disclosure will appreciate that spring assemblies configured in accordance with the disclosure could be extended to include three loading surfaces in the duct 602, four loading surfaces in the duct 602, and so forth.

In one or more embodiments, a first driver 607 and a second driver 608 are positioned, disposed, and/or otherwise situated within the duct 602. In this illustrative embodiment, the first driver 607 and the second driver 608 are situated in the duct 602 along the central axis 603 such that the first driver 607 and the second driver 608 may translate along the central axis 603 within the duct 602.

In one or more embodiments, each of the first driver 607 and the second driver 608 is configured to resemble a form of plunger. For example, in this illustrative embodiment the first driver 607 comprises a shaft and a head, referred to herein as a first shaft 609 and a first head 610, respectively. Similarly, the second driver 608 comprises a shaft and head, referred to herein as the second shaft 611 and second head 612, solely to distinguish the second shaft 611 and the second head 612 from the first shaft 609 and the first head 610.

In this illustrative embodiment, the first driver 607 abuts the second driver 608. More particularly, in this illustrative embodiment the first head 610 of the first driver 607 abuts the second shaft 611 of the second driver 608. In one or more embodiments, the first head 610 of the first driver 607 defines a concave receiver 613 that engages the second shaft 611 of the second driver 608.

In one or more embodiments the first shaft 609 of the first driver 607 and the second shaft 611 of the second driver 608 have a common length. In another embodiment, the first shaft 609 of the first driver 607 is shorter than the second shaft 611 of the second driver 608. In yet another embodiment, the second shaft 611 of the second driver 608 is shorter than the first shaft 609 of the first driver 607.

In one or more embodiments, the first head 610 of the first driver 607 and the second head 612 of the second driver 608 have the same configuration. For example, if the second head 612 of the second driver 608 were abutting a third shaft of a third driver in a three-driver system, the second head 612 of the second driver 608 could define a second concave receiver to engage the third shaft of the third driver. However, in this illustrative embodiment, the second head 612 of the second driver 608 is configured differently from the first head 610 of the first driver 607. In this embodiment, the second head 612 of the second driver 608 defines a convex abutment lobe 614 that resembles the head of a bullet. As will be described in more detail below, in one or more embodiments the second driver 608 is used as a follower and is biased against a cam in a hinge assembly. Where so used, configuring the second head 612 of the second driver 608 with a convex abutment lobe 614 allows the second head 612 of the second driver 608 to more smoothly pass about the exterior surface of the cam. Other configurations for either the first head 610 of the first driver 607 or the second head 612 of the second driver 608 will be obvious to those of ordinary skill in the art having the benefit of this disclosure.

In one or more embodiments, each of the first loading surface 604 and the second loading surface 605 defines an aperture. For example, where two loading surfaces are included the first loading surface 604 can define a first aperture 615. Similarly, the second loading surface 605 can define a second aperture 616. In this illustrative embodiment, each aperture has a central axis that is aligned with the central axis 603 of the duct 602. In other embodiments, each aperture may have an axis that is offset from the central axis 603 of the duct 602. Moreover, while each loading surface defines a single aperture in this embodiment, in other embodiments the loading surfaces may define multiple apertures or no apertures at all. Other configurations for the loading surfaces will be obvious to those of ordinary skill in the art having the benefit of this disclosure.

In one or more embodiments, the shaft of each driver passes through an aperture of its corresponding loading surface. For instance, in one embodiment the first shaft 609 of the first driver 607 passes through the aperture 615 defined by first loading surface 604. In this illustrative embodiment the second shaft 611 of the second driver 608 passes through the aperture 616 defined by the second loading surface 605.

In one or more embodiments, the shafts are mechanically operable and/or permitted to translate within each aperture. For instance, in one embodiment the first shaft 609 of the first driver 607 can translate through the aperture 615 defined by first loading surface 604, while the second shaft 611 of the second driver 608 can translate through the aperture 616 defined by the second loading surface 605. In this illustrative embodiment, the first shaft 609 of the first driver 607 can translate through the aperture 615 defined by first loading surface 604 along the central axis 603 of the duct 602, while the second shaft 611 of the second driver 608 can translate through the aperture 616 defined by the second loading surface 605 along the central axis 603 of the duct 602.

In one or more embodiments, a first spring 617 is positioned in the duct 602 between the first loading surface 604 and the first head 610 of the first driver 607. In one or more embodiments, a second spring 618 is then placed in the duct 602 between the second loading surface 605 and the second head 612 of the second driver 608. In this illustrative embodiment, each of the first spring 617 and the second spring 618 is configured as a coil spring. In this illustrative embodiment, the first spring 617 is disposed concentrically about the first shaft 609 of the first driver 617 between the first loading surface 604 and the first head 610 of the first driver 607. In this illustrative embodiment, the second spring 618 is disposed concentrically about the second shaft 611 of the second driver 608 between the second loading surface 605 and the second head 612 of the second driver 608. The first spring 617 and the second spring 618 could alternatively be placed adjacent to the shafts of the first driver 607 and the second driver 608 in another embodiment. Where springs other than coil springs are sued for the first spring 617 and the second spring 618, the arrangement of the springs and their corresponding drivers may change as well.

In one or more embodiments, the first spring 617 and the second spring 618 have a common length. In another embodiment, the first spring 617 is longer than the second spring 618. In still another embodiment, the first spring 617 is shorter than the second spring 618.

In one or more embodiments, the first spring 617 and the second spring 618 have a common diameter. In another embodiment, the first spring 617 has a larger diameter than the second spring 618. In still another embodiment, the first spring 617 has a smaller diameter than the second spring 618.

In one or more embodiments, the first spring 617 and the second spring 618 have a common spring coefficient. In another embodiment, the first spring 617 is stiffer, i.e., has a higher spring coefficient, than the second spring 618. In still another embodiment, the first spring 617 is softer, i.e., has a lower spring coefficient, than the second spring 618.

Where the first spring 617 and the second spring 618 have the same technical specifications, e.g., where the first spring 617 and the second spring 618 have a common length, a common diameter, and a common spring coefficient, advantages can arise. Illustrating by example, a common part can be used for each of the first spring 617 and the second spring 618. This requires the overall spring assembly 600 to have fewer parts. Moreover, the loading forces applied to the second driver 608 double when the first spring 617 and the second spring 618 have common technical specifications. This causes the effective loading force to be double the loading force of either the first spring 617 and the second spring 618 acting alone.

In one or more embodiments, each spring applies a loading force to the head of its corresponding driver to bias the driver away from the loading surface. For instance, in this illustrative embodiment the first spring 617 biases the first head 610 of the first driver 607 away from the first loading surface 604 by applying a force to the left (as viewed in FIG. 6) against the first loading surface 604 along the central axis 603 of the duct 602, while applying another force to the right along the central axis 603 of the duct 602 against the back side of the first head 610 of the first driver 607. This biasing action of the first spring 617 away from the first loading surface 604 causes the first head 610 of the first driver 607 to apply a first loading force 619 to the second driver 608.

Meanwhile, the second spring 618 biases the second head 612 of the second driver 608 away from the second loading surface 605 by applying a force to the left (as viewed in FIG. 6) against the second loading surface 605 along the central axis 603 of the duct 602, while applying another force to the right along the central axis 603 of the duct 602 against the back side of the second head 612 of the second driver 608. This biasing action of the second spring 618 away from the second loading surface 605 applies a second loading force 620 to the second driver 608.

In this illustrative embodiment, the first loading force 619 and the second loading force 620 are applied to the second driver 608 in a common direction, which is to the right along the central axis 603 of the duct 602 in the illustrative embodiment of FIG. 6. The result of the first loading force 619 and the second loading force 620 biases the second driver 608 away from the second loading surface 605, which is to the right along the central axis 603 of the duct 602 in the illustrative embodiment of FIG. 6.

The first loading force 619 and the second loading force 620 therefore operate on the second driver 608 in parallel. This is true due to the fact that the first loading force 619 and the second loading force 620 sum, thereby doubling the effective spring force where the first spring 617 and the second spring 618 have the same spring coefficient. This parallel operation of the first loading force 619 and the second loading force 620 occurs despite the fact that the first spring 617 and the second spring 618 appear to be physically placed in series in FIG. 6. This is one of the primary advantages of the spring assembly 600, namely, that the first spring 617 and the second spring 618 are physically arranged in series within the duct 602 of the housing 601, but operate on the second driver 608 in parallel to increase the effective spring force.

In one or more embodiments, since the first head 610 of the first driver 607 abuts the second shaft 611 of the second driver 608, when the first spring 617 biases the first driver 607 away from the first loading surface 604, this causes the first driver 607 to apply a first loading force 619 to the second driver 608. In one or more embodiments, the second spring 618 biases, at the same time, the second driver 608 away from the second loading surface 605. This applies a second loading force 620 to the second driver 608. In one or more embodiments, the first loading force 619 and the second loading force 620 are applied along a common direction. This results in both loading forces biasing the second driver 608 away from the second loading surface 605. In one or more embodiments, this causes the second driver 608 to translate within the duct 602 along the central axis 603.

In accordance with one or more embodiments the first spring 617 and the second spring 618 look, physically, to be placed in series. This is true because the second spring 618 is disposed between the second head 612 of the second driver 608 and the first spring 617, while the first spring 617 is disposed between the second spring 618 and the first loading surface 604. However, due to the fact that the first spring 617 causes the first driver 607 to apply the first loading force 619 to the second driver 608, these two "series looking" springs actually apply a parallel force to the second driver 608.

In one or more embodiments, this spring assembly 600 is used in a hinged electronic device, i.e., a clamshell device, which includes a flexible display. To use the spring assembly 600 in such a manner, in one or more embodiments a rotatable cam 621 abuts the convex abutment lobe 614 of the second head 612 of the second driver 608.

In this illustrative embodiment, the rotatable cam 621 defines a "cat head shape," as is the case in FIG. 6. In this illustrative embodiment, the rotatable cam 621 has a major face 622 that has the appearance of a silhouette of a cat's head. Said differently, the major face 622 includes one or more protrusions 623,624 resembling cat ears spaced by a surface 625 resembling a cat forehead.

In this illustrative embodiment, the rotatable cam 621 can also includes two concave recesses 626,627, each resembling cat cheek. A lower surface 628 then resembles a cat chin, with convex protrusions 629,630 disposed on each side of the cat head shape between the concave "cat cheek" recesses 626,627 and the "cat chin" lower surface 628. Each convex protrusion 629,630 thus resembles cat whiskers. The operation of such one embodiment of such a hinge assembly is described below with reference to FIGS. 7-8.

Figure 7:
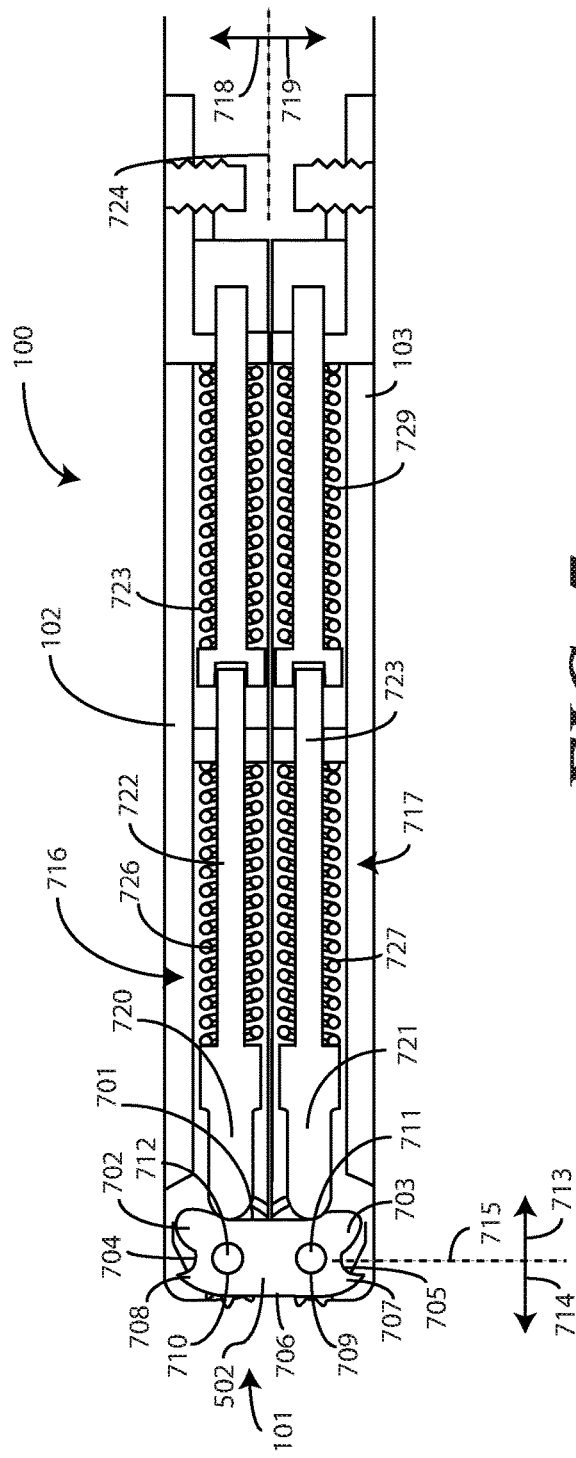
FIG. 7 illustrates one explanatory hinge assembly in accordance with one or more embodiments of the disclosure in an electronic device when the electronic device is in the closed position.

Turning now to FIG. 7, illustrated therein is a cut-away view of the electronic device 100 of FIG. 1 illustrating a first cam 502 from FIG. 5. The configuration of the first cam 502 is the same as that of the configuration of the second cam (503) in one or more embodiments. Accordingly, the description of the first cam 502 and its configuration would be the same for the second cam (503), which is omitted here for brevity.

As shown in FIG. 7, the first cam 502 looks strikingly like the head of a cat. In the view of FIG. 7, the cat head is turned on its head. However, as shown, the cat head includes a cat forehead surface 701, a first cat ear protrusion 702, and a second cat ear protrusion 703. The cat forehead surface 701 is disposed between the first cat ear protrusion 702, and the second cat ear protrusion 703 in this embodiment.

In this illustrative embodiment, a first cat cheek recess 704 is positioned between the first cat ear protrusion 702 and a cat chin surface 706, which is substantially flat. A second cat cheek recess 705 is positioned between the second cat ear protrusion 703 and the cat chin surface 706. A first cat whisker protrusion 708 is convex, and is positioned between the first cat cheek recess 704 and the cat chin surface 706. Similarly, a second cat whisker protrusion 707 is positioned between the second cat cheek recess 705 and the cat chin surface 706 in this embodiment.

A first aperture 710 defines a first cat eye, and a second aperture 709 defines a second cat eye. A first pivot 712 extends through the first aperture 710, which is an eye aperture when considering the first cam 502 to be cat head shaped, while the second pivot 711 extends through the second aperture 709, which is also an eye aperture in this embodiment.

In this illustrative embodiment, the first cat ear protrusion 702 and the second cat ear protrusion 703 are disposed on, and extend from, a first side 713 of the cat head shaped cam 502. Meanwhile, the cat chin surface 706 is centrally located on a second side 714 of the cat head shaped cam 502. With reference to the description of the location of the first cat ear protrusion 702 and the second cat ear protrusion 703 relative to the cat chin surface 706, the first side 713 and the second side 714 are separated by a reference line 715 running through the first eye aperture 710 and the second eye aperture 709. Said differently, the second side 714 is disposed opposite axes of the first pivot 712 and the second pivot 711 of the cat head shaped cam 502 from the first side 713.

As shown in FIG. 7, the hinge 101 further comprises a first follower 716 and a second follower 717. The first follower 716 is biased against a first side 718 of the cat head shaped cam 502, while the second follower 717 is biased against a second side 719 of the cat head shaped cam 502.

In this illustrative embodiment, each of the first follower 716 and the second follower 717 comprises the spring assembly (600) of FIG. 6. Accordingly, a first convex abutment lobe 720 of a driver 722 of a first spring assembly is biased against the first side 718 of the cat head shaped cam 502, while a second convex abutment lobe 721 of a driver 723 of a second spring assembly is biased against the second side 719 of the cat head shaped cam 502. Accordingly, each convex abutment lobe 720,721 defines a follower biased against a first side 718 and a second side 719, of the cat head shaped cam 502, respectively.

Since the first follower 716 is defined by a first spring assembly, and the second follower 717 is defined by a second spring assembly, at least one of the first device housing 102 or the second device housing 103 defines, as described above with reference to FIG. 6, a duct having a central axis and comprising a first loading surface extending into the duct toward the central axis and a second loading surface extending into the duct toward the central axis. At least another of the first device housing 102 or the second device housing 103 then defines, also as described above with reference to FIG. 6, another duct having another central axis and comprising a third loading surface extending into the another duct toward the another central axis and a fourth loading surface extending into the another duct toward the central axis.

The first follower 716 will include a first driver comprising a first shaft extending distally from a first head, a first spring biasing the first head away from the first loading surface, a second driver comprising as second shaft extending distally from a second head, the second head abutting the first shaft, and a second spring biasing the second head away from the second loading surface. The first spring biases the first driver away from the first loading surface, thereby causing the first driver to apply a first loading force to the second driver, and the second spring applies a second loading force to the second driver. The second follower 717 will include a third driver comprising a third shaft extending distally from a third head, a third spring biasing the third head away from the third loading surface, a fourth driver comprising as fourth shaft extending distally from a fourth head, the fourth head abutting the third shaft, and a fourth spring biasing the second head away from the second loading surface. The third spring biases the third head away from the third loading surface, thereby applying a third loading force to the third head, and the fourth spring biases fourth head away from the fourth loading surface, thereby causing the fourth head to apply a fourth loading force against the third shaft. Each of these components is shown in FIG. 7. However, since these components were described in detail with reference to FIG. 6, reference designators for the previously described components are omitted in FIG. 7 for simplicity.

Figure 8:
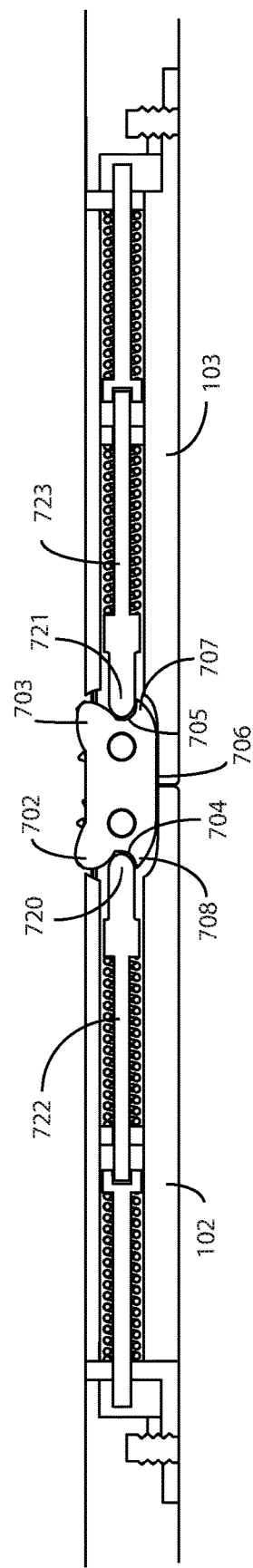
FIG. 8 illustrates one explanatory hinge assembly in accordance with one or more embodiments of the disclosure in an electronic device when the electronic device is in the open position.

As will be described below, these followers are able to translate between abutting the cat forehead surface 701, as shown in FIG. 7, when the cat head shaped cam 502 is in a first position, and to a location where the convex abutment lobes 720,721 are situated in the first cat cheek recess 704 and the second cat cheek recess 705, respectively, when the cat head shaped cam 502 is in a second position, which is shown in FIG. 8. With reference to the description of the first follower 716 and the second follower 717, the first side 718 and the second side 719 are separated by a reference line 724 running from the cat forehead surface 701 to the cat chin surface 706 between the first eye aperture 710 and the second eye aperture 711.

Since each cat cheek recess 704,705 is a concave recess extending into the cat head shaped cam 502, each defines a detent. As shown in FIG. 7, the electronic device 100 is in the closed position (201). In one or more embodiments, the first convex abutment lobe 720 of a driver 722 of the first spring assembly and the second convex abutment lobe 721 of a driver 723 of the second spring assembly situate between the first cat ear protrusion 702 and the second cat ear protrusion 703, as shown in FIG. 7, when the first device housing 102 is pivoted about the hinge 101 toward the second device housing 103 to the closed position (201). The inner slopes of the first cat ear protrusion 702 and the second cat ear protrusion 703, each of which is roughly thirty degrees relative to the cat forehead surface 701, retains the first convex abutment lobe 720 of a driver 722 of the first spring assembly and the second convex abutment lobe 721 of a driver 723 of the second spring assembly between the first cat ear protrusion 702 and the second cat ear protrusion 703 to keep the electronic device 100 in the closed position (201).

To open the electronic device 100, a user must apply sufficient force to compress the first spring 726 and the second spring 728 of the first spring assembly, and the first spring 727 and the second spring 729 of the second spring assembly sufficiently to allow the first convex abutment lobe 720 of a driver 722 of the first spring assembly and the second convex abutment lobe 721 of a driver 723 of the second spring assembly to pass over the first cat ear protrusion 702 and the second cat ear protrusion 703, respectively.

As the electronic device 100 transitions the closed position (201) of FIG. 7 to an open position, which is shown in FIG. 8, the first device housing 102 pivots about the hinge 101 away from the second device housing 103 toward the open position. This causes the first spring 726 and the second spring 728 of the first spring assembly to compress as the first convex abutment lobe 720 of a driver 722 of the first spring assembly to climb the first cat ear protrusion 702. Similarly, it causes the first spring 727 and the second spring 729 of the second spring assembly to compress as the second convex abutment lobe 721 of a driver 723 of the second spring assembly climbs the second cat ear protrusion 703.

When the first convex abutment lobe 720 of a driver 722 of the first spring assembly and the second convex abutment lobe 721 of a driver 723 of the second spring assembly have not yet reached apexes of the first cat ear protrusion 702 and the second cat ear protrusion 703, respectively, if the user were to let go of the first device housing 102 and the second device housing 103, the electronic device 100 would return to the closed position (201) due to the fact that the first cat ear protrusion 702 and the second cat ear protrusion 703 cause the first convex abutment lobe 720 of a driver 722 of the first spring assembly and the second convex abutment lobe 721 of a driver 723 of the second spring assembly to bias toward the closed position when between apexes of the first cat ear protrusion 702 and the second cat ear protrusion 703.

Turning now to FIG. 8, the first device housing 102 and the second device housing 103 have been opened sufficiently that the first convex abutment lobe 720 of a driver 722 of the first spring assembly and the second convex abutment lobe 721 of a driver 723 of the second spring assembly pass over apexes of the first cat ear protrusion 702 and the second cat ear protrusion 703. When this occurs, the same spring action described in the preceding paragraph works to bias the first device housing 102 and the second device housing 103 toward the open position (401), which is shown in FIG. 8.

In the open position (401), the first cat ear protrusion 702 and the second cat ear protrusion 703 situate between the first convex abutment lobe 720 of a driver 722 of the first spring assembly and the second convex abutment lobe 721 of a driver 723 of the second spring assembly. This occurs when the first device housing 102 is pivoted about the hinge 101 away from the second device housing 103 to the open position (401), as shown in FIG. 8.

As was the case with the closed position (201), in one or more embodiments a retention system is in place to retain the first device housing 102 and the second device housing 103 in the open position (401). This occurs in this illustrative embodiment when the first convex abutment lobe 720 of a driver 722 of the first spring assembly situates within the first cat cheek recess 704 and the second convex abutment lobe 721 of a driver 723 of the second spring assembly situates within the second cat cheek recess 705. This results in the first convex abutment lobe 720 of a driver 722 of the first spring assembly being disposed between the cat chin surface 706 and the first cat ear protrusion 702, while the second convex abutment lobe 721 of a driver 723 of the second spring assembly is situated between the cat chin surface 706 and the second cat ear protrusion 703. More particularly, in the first convex abutment lobe 720 of a driver 722 of the first spring assembly being disposed between the first cat whisker protrusion 708 and the first cat ear protrusion 702, while the second convex abutment lobe 721 of a driver 723 of the second spring assembly is situated between the second cat whisker protrusion 707 and the second cat ear protrusion 703 in this embodiment.

By comparing FIG. 7 and FIG. 8, the advantages of using the spring assembly (600) of FIG. 6, along with the cat head shaped cam 502, can be readily seen. As shown and described, the first cat ear protrusion 702 and the second cat ear protrusion 703 define a first detent, formed by a recess defined by the inner slopes of the first cat ear protrusion 702 and the second cat ear protrusion 703 and the cat forehead surface 701, that retains the first device housing 102 at a first predefined angular alignment, i.e., the closed position (201), relative to the second device housing 103 about the hinge 101. Meanwhile, the first cat cheek recess 704 and the second cat cheek recess 705 collectively define a second detent that works retaining the first device housing 102 at a second predefined angular alignment, i.e., the open position (401), relative to the second device housing 103 about the hinge 101.

The inclusion of the cat ear shaped protrusions and the cat cheek recesses advantageously allows the hinge 101 to selectively lock in either the open position (401) or closed position (201). For instance, in one or more embodiments, the first follower 716 defined by the first convex abutment lobe 720 of a driver 722 of the first spring assembly, and the second follower defined by the second convex abutment lobe 721 of a driver 723 of the second spring assembly situate between the first cat ear protrusion 702 and the second cat ear protrusion 703, along the cat forehead surface 701, when the first device housing 102 is pivoted about the hinge 101 toward the second device housing 103 to the closed position (201). The first cat ear protrusion 702 and the second cat ear protrusion 703 retain the first follower 716 and the second follower 717 therebetween with sufficient force to lock the first device housing 102 and the second device housing 103 in the closed position (201).

By contrast, the first convex abutment lobe 720 of a driver 722 of the first spring assembly and the second convex abutment lobe 721 of a driver 723 of the second spring assembly situate in the first cat cheek recess 704 and the second cat cheek recess 705, respectively, when the first device housing 102 is pivoted about the hinge 101 away from the second device housing 103 toward the open position (401). Accordingly, the first follower 716 and the second follower 717 selectively lock the first device housing 102 and the second device housing 103 in the open position (401).

Figure 9:
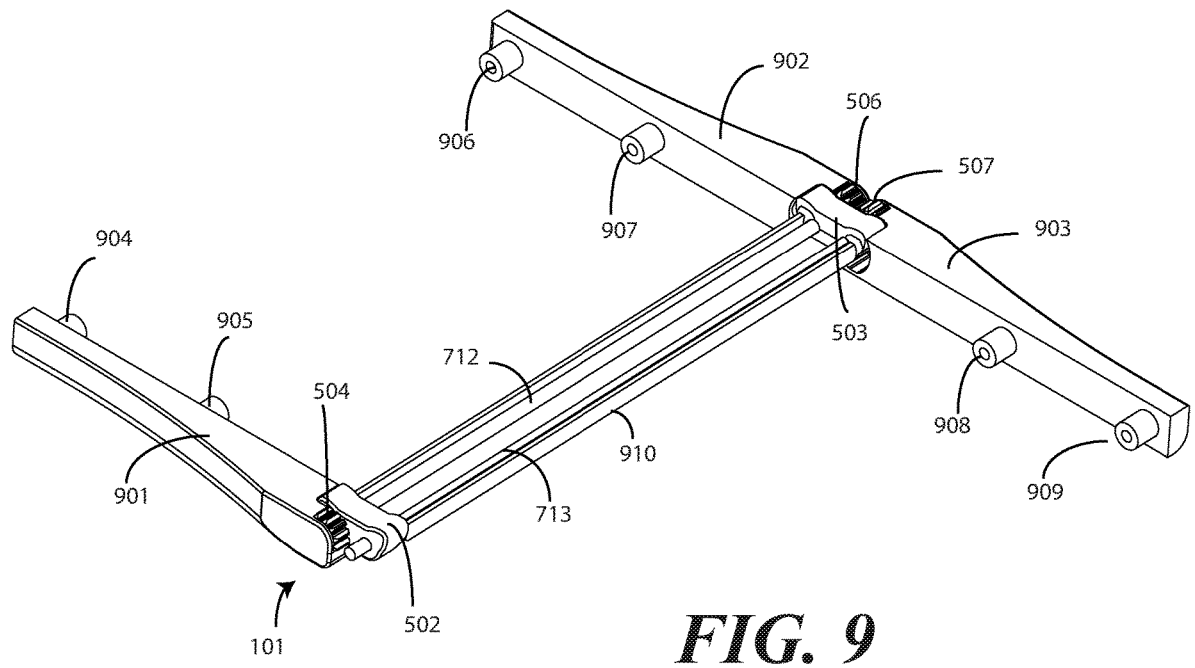
FIG. 9 illustrates one or more explanatory components for one or more hinge assemblies configured in accordance with one or more embodiments of the disclosure.

Turning now to FIG. 9, illustrated therein are additional components that can be used in a hinge 101 configured in accordance with one or more embodiments of the disclosure. As shown, in one or more embodiments the hinge 101 includes the first cam 502 and the second cam 503. Adjacent to the first cam 502 is the first toothed wheel 504, which is defined at the end of housing member 901. (The second toothed wheel (505), which engages the first toothed wheel 504 is not shown in FIG. 9 so that a better view of the first toothed wheel 504 can be seen.) Adjacent to the second cam 503 are the third toothed wheel 506 and the fourth toothed wheel 507. In this illustrative embodiment, the housing members 901,902,903 each comprise one or more screw bosses 904,905,906,907,908,909, so that the housing members 901,902,903 can be coupled to the first device housing (102) and the second device housing (103), respectively. Where these separate housings members 901,902,903 are used, each housing member the spring assemblies of FIGS. 7-8 can be incorporated into the housing members 901,902, 903 in one embodiment. In other embodiments, these separate housing members 901,902,903 will be omitted, with the spring assemblies of FIGS. 7-8 being incorporated into the first device housing 102 and the second device housing 103.

In this illustrative embodiment, the hinge 101 includes a first pivot 712 and a second pivot 713. Each of the first pivot 712 and the second pivot 713 extends through an aperture in the first cam 502 and the second cam 503, and engages a corresponding aperture in each of the housing members 901,902,903. The removal of a fourth housing member, which would cover the second pivot 713 at the first cam 502, illustrates how second pivot 713 passes through an aperture in the first cam 502 and would then, by protruding through the first cam 502, engage an aperture in the removed housing member, which would be a mirror image of housing member 903. The same configuration occurs with the remaining housing members 901,902,903 in one or more embodiments.

In this illustrative embodiment, a pivot cover tray 910 couples the first cam 502 and the second cam 503. In one or more embodiments, the pivot cover tray 910 covers the first pivot 712 and the second pivot 713, and serves as an exterior housing member at the hinge between the housing members 901,902,903. In other embodiments, the pivot cover tray 910 will be excluded and extensions of the first device housing (102) and the second device housing (103) will cover the first pivot 712 and the second pivot 713. Still other configurations will be obvious to those of ordinary skill in the art having the benefit of this disclosure.

Figure 10:
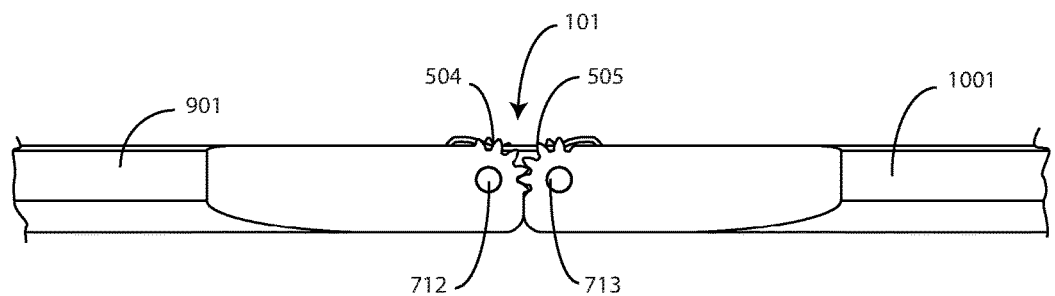
FIG. 10 illustrates explanatory hinge components in accordance with one or more embodiments of the disclosure.

FIG. 10 shows a cutaway view of the opposite side of the hinge 101 from that shown in FIG. 9. From this view, the first toothed wheel 504 and the second toothed wheel 505 can be seen. In one or more embodiments housing member 901, which constitutes an extension of the first device housing (102), comprises at least a first toothed wheel 504. In another embodiment, the first device housing (102) can include an edge that terminates at the first toothed wheel 504. In one or more embodiments housing member 1001, which was removed in FIG. 9, and which constitutes an extension of the second device housing (103), comprises at least a second toothed wheel 505. In another embodiment, the second device housing (103) can include an edge that terminates at the second toothed wheel 505.

In one or more embodiments, the first toothed wheel 504 engages the second toothed wheel 505 when the first device housing (102) pivots about the hinge 101 relative to the second device housing (103). The engagement of the first toothed wheel 504 and the second toothed wheel 505 creates a symmetric angular rotation of the first device housing (102) and the second device housing (103) when the first device housing (102) pivots about the hinge relative to the second device housing (103).

FIG. 10 also shows how the first pivot 712 and the second pivot 713 engage housing member 901 and housing member 1001, respectively, in one or more embodiments. By terminating in housing members 901,1001 and passing through the cat head shaped cam (502), the cat head shaped cam (502) is pivotable about both the first pivot 712 and the second pivot 713.

As noted above, the use of spring assemblies configured in accordance with embodiments of the disclosure offer numerous advantages. For instance, as described above with reference to FIGS. 7-8, the spring assemblies can be used as followers to bias the second driver against the cat head shaped cam on only one side of the electronic device. The parallel operation of the springs provides a stiffer equivalent spring, thereby allowing followers from the other side of the electronic device to be removed. This frees up precious real estate within the electronic device for components such as volume controls or power switches. Such an embodiment is shown in FIG. 11.

Figure 11:
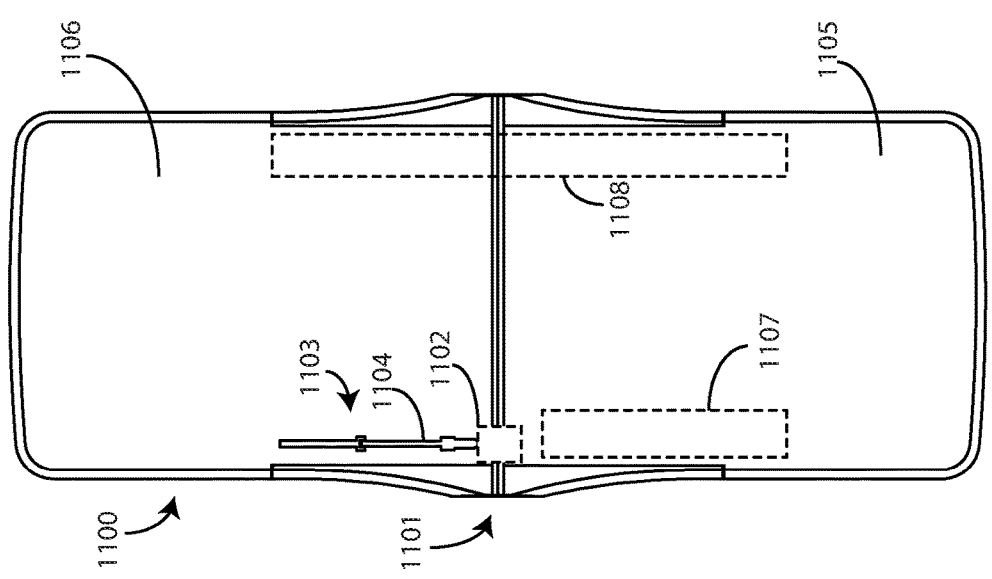
FIG. 11 illustrates one explanatory electronic device in accordance with one or more embodiments of the disclosure.

Turning now to FIG. 11, illustrated therein is an electronic device 1100 having a hinge 1101. Rather than having a first cam 1102 on the left side of the electronic device 1100 and a second cam on the right side of the electronic device 1100 as previously described, in this illustrative embodiment only the first cam 1102 is included. Moreover, as shown in FIG. 11 only one spring assembly 1103 is included to bias the second driver 1104 of the spring assembly 1103 against the cam 1102.

An advantage is that the parallel operation of the first spring and the second spring of the spring assembly 1103 is that it biases the second follower 1104 against the cam 1102 with a higher force. This results in higher torque. Higher torque results in better locking of the first device housing 1105 and the second device housing 1106 in the open position. Not only does this higher torque allow the flexible display to be stretched flat with more force, thereby preventing mechanical bending memory effects from affecting the flexible display, as well as allowing the cam profile to be shorter, but it also frees up real estate 1107,1108 that would normally be occupied by follower assemblies for other uses, such as the inclusion of switches, volume controls, and other user interface components.

Figure 12:
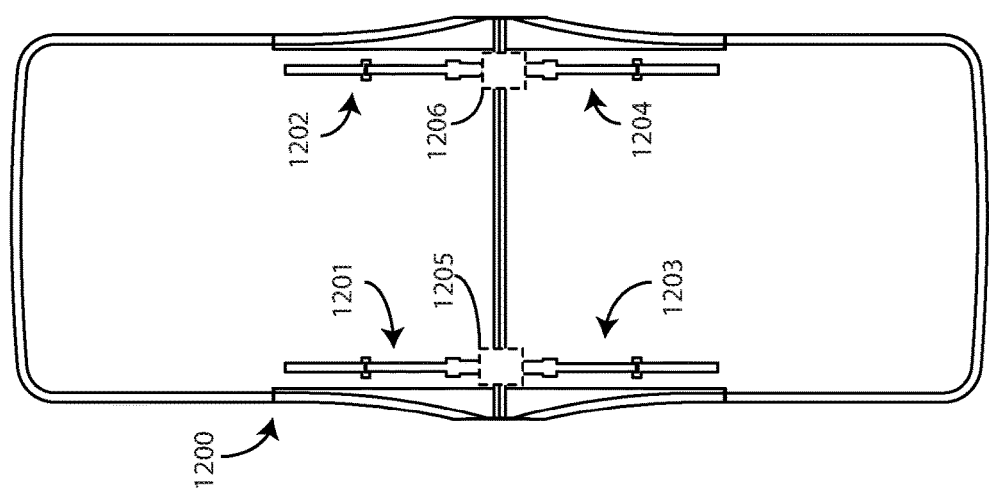
FIG. 12 illustrates another explanatory electronic device in accordance with one or more embodiments of the disclosure.

It should be noted that spring assemblies can be used in various combinations as cam followers in accordance with one or more embodiments of the disclosure. For example, turning now to FIG. 12, in one embodiment an electronic device 1200 can include four spring assemblies 1201,1202, 1203,1204, with two spring assemblies 1201,1202 being used as followers for a first cam 1205 and two other spring assemblies 1203,1204 being used as followers for a second cam 1206.

Figure 13:
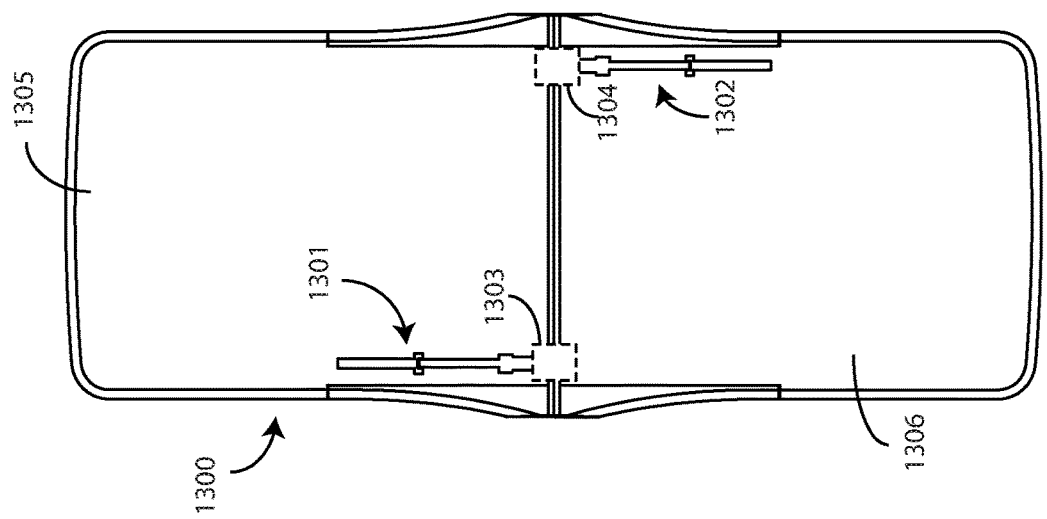
FIG. 13 illustrates yet another explanatory electronic device in accordance with one or more embodiments of the disclosure.

By contrast, and turning now to FIG. 13, in another electronic device 1300, only two spring assemblies are used as followers for the two cams 1303,1304. In this illustrative embodiment, a first follower 1301 is disposed on the left side of the electronic device 1300 in the first housing 1305, while the second follower 1302 is disposed on the right side of the electronic device 1300 in the second housing 1306. In another embodiment, both the first follower 1301 and the second follower are disposed on the left and sides of the electronic device 1300 in the first housing 1305. In still another embodiment, both the first follower 1301 and the second follower are disposed on the left and sides of the electronic device 1300 in the second housing 1306.

Figure 14:
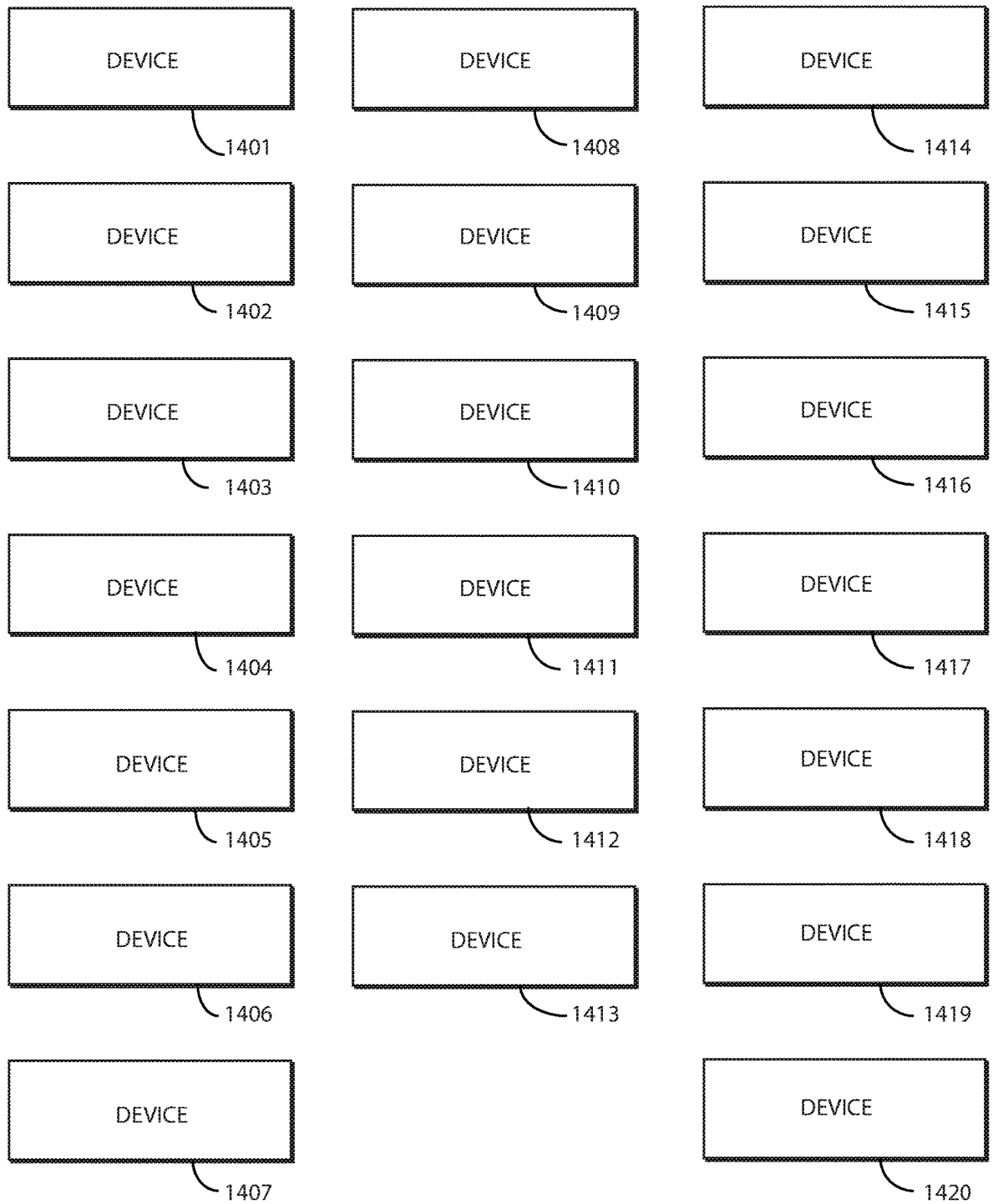
FIG. 14 illustrates various embodiments of the disclosure.

Turning now to FIG. 14, illustrated therein are various embodiments of the disclosure. At 1401, a device comprises a housing defining a duct having a central axis. At 1401, the housing comprises a first loading surface extending into the duct toward the central axis and a second loading surface extending into the duct toward the central axis. At 1401, the device comprises a first driver and a second driver, situated within the duct along the central axis, with the first driver abutting the second driver. At 1401, a first spring biases the first driver away from the first loading surface, thereby causing the first driver to apply a first loading force to the second driver. At 1401, a second spring applies a second loading force to the second driver, along a common direction with the first loading force, to bias the second driver away from the second loading surface.

At 1402, the first loading force and the second loading force of 1401 operate on the second driver in parallel. At 1403, the first loading surface of 1401 defines a first aperture. At 1403, the first driver comprises a first shaft and a first head, with the first shaft passing along the central axis and through the first aperture.

At 1404, the second loading surface of 1403 defines a second aperture. At 1404, the second driver comprises a second shaft and a second head, with the second shaft passing along the central axis, through the second aperture, and abutting the first head of the first driver.

At 1405, the first spring of 1404 is concentrically disposed about the first shaft between the first loading surface and the first head. At 1405, the first spring biases the first head away from the first loading surface.

At 1406, the second spring of 1405 is concentrically disposed about the second shaft between the second loading surface and the second head. At 1406, the second spring biases the second head away from the second loading surface.

At 1407, the first spring and the second spring of 1406 have a common length, a common diameter, and a common spring coefficient. At 1408, the first head of 1406 defines a concave receiver engaging the second shaft. At 1408 the second head defining a convex abutment lobe.

At 1409, the device of 1408 further comprises a rotatable cam abutting the convex abutment lobe. At 1410, the rotatable cam of 1409 defines a cat head shape defining at least one cat ear protrusion disposed between a cat forehead surface and a cat cheek recess. At 1410, the convex abutment lobe of 1409 defines a follower biased against a first side of the cat head shape by the first spring and the second spring. At 1410, the follower is operable to translate between abutting the cat forehead surface when the rotatable cam is in a first position and situated within the cat cheek recess when the rotatable cam is in a second position.

At 1411, a device comprises a first device housing and a second device housing. At 1411, at least one of the first device housing or the second device housing defines a duct having a central axis and comprising a first loading surface extending into the duct toward the central axis and a second loading surface extending into the duct toward the central axis.

At 1411, a hinge couples the first device housing to the second device housing. At 1411, the first device housing is pivotable about the hinge relative to the second device housing.

At 1411, the hinge comprises a rotating cam, a first driver comprising a first shaft extending distally from a first head, a first spring biasing the first head away from the first loading surface, a second driver comprising as second shaft extending distally from a second head, with the second head abutting the first shaft, and a second spring biasing the second head away from the second loading surface. At 1411, the first head is biased against a first side of the rotating cam by the first spring biasing the first head away from the first loading surface, thereby applying a first loading force to the first head, and the second spring biasing second head away from the second loading surface, thereby causing the second head to apply a second loading force against the first shaft.

At 1412, the first shaft of 1411 is situated along the central axis, the second shaft is situated along the central axis, the first spring is concentrically disposed about the first shaft, and the second spring is concentrically disposed about the second shaft. At 1413, the first loading surface of 1411 is disposed between the first spring and the second spring. At 1414, the second head of 1413 is disposed between the second spring and the first loading surface.

At 1415, at least another of the first device housing or the second device housing of 11414 defines another duct having another central axis, and comprises a third loading surface extending into the another duct toward the another central axis and a fourth loading surface extending into the another duct toward the central axis. At 1415, the device further comprises a third driver comprising a third shaft extending distally from a third head, a third spring biasing the third head away from the third loading surface, a fourth driver comprising as fourth shaft extending distally from a fourth head, with the fourth head abutting the third shaft, and a fourth spring biasing the second head away from the second loading surface.

At 1416, the third head of 1415 is biased against a second side of the rotating cam by the third spring biasing the third head away from the third loading surface, thereby applying a third loading force to the third head, and the fourth spring biasing fourth head away from the fourth loading surface, thereby causing the fourth head to apply a fourth loading force against the third shaft.

At 1417, the rotating cam of 1416 defines a cat head shape defining a first cat ear shaped protrusion separated from a second cat ear shaped protrusion by a cat forehead surface. At 1417, the rotating cam further defines a first cat cheek recess separated from a second cat cheek recess by the first cat ear shaped protrusion and the second cat ear shaped protrusion. At 1417, the first head and the third head situate between the first cat ear shaped protrusion and the second cat ear shaped protrusion when the first device housing is pivoted about the hinge toward the second device housing to a closed position. At 1418, the first head and the third head of 1417 situate in the first cat cheek recess and the second cat cheek recess, respectively, when the first device housing is pivoted about the hinge away from the second device housing to an open position.

At 1419, a device comprises a first device housing and a second device housing. At 1419, a hinge couples the first device housing to the second device housing, and the first device housing pivotable about the hinge relative to the second device housing. At 1419, the hinge comprises a cam and a follower. At 1419, the follower comprises a first driver and a second driver, with the first driver comprising a first end abutting the cam and a second end abutting the second driver.

At 1419, a first spring biases the first driver against the cam. At 1419, a second spring biases the second driver against the second end of the first driver. At 1420, at least one of the first device housing or the second device housing of 1419 comprises a duct having a central axis and comprising a first loading surface extending into the duct toward the central axis and a second loading surface extending into the duct toward the central axis.

At 1420, each of the first driver, the first spring, the second driver, and the second spring are disposed within the duct. At 1420, the first driver, the first spring, and the second spring are disposed between the second loading surface and the cam. At 1420, the first spring is disposed between the first loading surface and the cam and the first loading surface is disposed between the first spring and the second spring.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while being used primarily as a follower, spring assemblies configured in accordance with embodiments of the disclosure could be used as latching members in other applications. Still other uses for spring assemblies configured in accordance with embodiments of the disclosure will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising:
   a housing defining a duct having a central axis, the housing comprising a first loading surface extending into the duct toward the central axis and a second loading surface extending into the duct toward the central axis;
   a first driver and a second driver, situated within the duct along the central axis, the first driver abutting the second driver;

a first spring biasing the first driver away from the first loading surface, thereby causing the first driver to apply a first loading force to the second driver; and a second spring applying a second loading force to the second driver, along a common direction with the first loading force, to bias the second driver away from the second loading surface;

wherein the first loading surface defines a first aperture, the first driver comprises a first shaft and a first head, the first shaft passes along the central axis and through the first aperture.

2. The device of claim 1, wherein the first loading force and the second loading force operate on the second driver in parallel.

3. The device of claim 1, wherein the central axis is aligned with another central axis of the duct.

4. The device of claim 1, the second loading surface defining a second aperture, the second driver comprising a second shaft and a second head, the second shaft passing along the central axis, through the second aperture, and abutting the first head of the first driver.

5. The device of claim 4, the first spring concentrically disposed about the first shaft between the first loading surface and the first head, the first spring biasing the first head away from the first loading surface.

6. The device of claim 5, the second spring concentrically disposed about the second shaft between the second loading surface and the second head, the second spring biasing the second head away from the second loading surface.

7. The device of claim 6, wherein the first spring and the second spring have a common length, a common diameter, and a common spring coefficient.

8. The device of claim 6, the first head defining a concave receiver engaging the second shaft, the second head defining a convex abutment lobe.

9. The device of claim 8, further comprising a rotatable cam abutting the convex abutment lobe.

10. The device of claim 9, the rotatable cam defining a shape defining at least one protrusion disposed between a surface and a recess, the convex abutment lobe defining a follower biased against a first side of the shape by the first spring and the second spring, the follower operable to translate between abutting the surface when the rotatable cam is in a first position and situated within the recess when the rotatable cam is in a second position.

11. A device, comprising:
a first device housing and a second device housing, at least one of the first device housing or the second device housing defining a duct having a central axis and comprising a first loading surface extending into the duct toward the central axis and a second loading surface extending into the duct toward the central axis;
a hinge coupling the first device housing to the second device housing, the first device housing pivotable about the hinge relative to the second device housing;
the hinge comprising:
a rotating cam;
a first driver comprising a first shaft extending distally from a first head;
a first spring biasing the first head away from the first loading surface;
a second driver comprising as second shaft extending distally from a second head, the second head abutting the first shaft; and
a second spring biasing the second head away from the second loading surface;

the first head biased against a first side of the rotating cam by:
the first spring biasing the first head away from the first loading surface, thereby applying a first loading force to the first head; and
the second spring biasing second head away from the second loading surface, thereby causing the second head to apply a second loading force against the first shaft.

12. The device of claim 11, wherein:
the first shaft is situated along the central axis;
the second shaft is situated along the central axis;
the first spring is concentrically disposed about the first shaft; and
the second spring is concentrically disposed about the second shaft.

13. The device of claim 11, wherein the first loading surface is disposed between the first spring and the second spring.

14. The device of claim 13, wherein the second head is disposed between the second spring and the first loading surface.

15. The device of claim 14, at least another of the first device housing or the second device housing defining another duct having another central axis and comprising a third loading surface extending into the another duct toward the another central axis and a fourth loading surface extending into the another duct toward the central axis, the device further comprising:
a third driver comprising a third shaft extending distally from a third head;
a third spring biasing the third head away from the third loading surface;
a fourth driver comprising as fourth shaft extending distally from a fourth head, the fourth head abutting the third shaft; and
a fourth spring biasing the second head away from the second loading surface.

16. The device of claim 15, the third head biased against a second side of the rotating cam by:
the third spring biasing the third head away from the third loading surface, thereby applying a third loading force to the third head; and
the fourth spring biasing fourth head away from the fourth loading surface, thereby causing the fourth head to apply a fourth loading force against the third shaft.

17. The device of claim 16, the rotating cam defining a shape defining a first shaped protrusion separated from a second shaped protrusion by a surface, the rotating cam further defining a first recess separated from a second recess by the first shaped protrusion and the second shaped protrusion, wherein the first head and the third head situate between the first shaped protrusion and the second shaped protrusion when the first device housing is pivoted about the hinge toward the second device housing to a closed position.

18. The device of claim 17, wherein the first head and the third head situate in the first recess and the second recess, respectively, when the first device housing is pivoted about the hinge away from the second device housing to an open position.

19. A device, comprising:
a first device housing and a second device housing; and
a hinge coupling the first device housing to the second device housing, the first device housing pivotable about the hinge relative to the second device housing;
the hinge comprising:
a cam; and a follower, the follower comprising:
  a first driver and a second driver, the first driver comprising a first end abutting the cam and a second end abutting the second driver;
  a first spring biasing the first driver against the cam; and
  a second spring biasing the second driver against the second end of the first driver.

20. The device of claim 19, wherein:
  at least one of the first device housing or the second device housing comprises a duct having a central axis and comprising a first loading surface extending into the duct toward the central axis and a second loading surface extending into the duct toward the central axis; and
  each of the first driver, the first spring, the second driver, and the second spring are disposed within the duct with:
    the first driver, the first spring, and the second spring disposed between the second loading surface and the cam;
    the first spring disposed between the first loading surface and the cam; and
    the first loading surface disposed between the first spring and the second spring.

* * * * *